US010277284B1

(12) United States Patent
Kerselaers (10) Patent No.: US 10,277,284 B1
(45) Date of Patent: Apr. 30, 2019

(54) NEAR-FIELD DEVICE

(71) Applicant: NXP B.V., Eindhoven (NL)

(72) Inventor: Anthony Kerselaers, Herselt (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/196,036

(22) Filed: Nov. 20, 2018

(51) Int. Cl.
*G01R 29/10* (2006.01)
*H04B 5/00* (2006.01)

(52) U.S. Cl.
CPC ......... *H04B 5/0081* (2013.01); *H04B 5/0043* (2013.01)

(58) Field of Classification Search
None
See application file for complete search history.

(56) References Cited

U.S. PATENT DOCUMENTS

| | | | |
|---|---|---|---|
| 3,963,990 | A | 6/1976 | DiFonzo |
| 4,849,685 | A | 7/1989 | Nave |
| 5,017,878 | A | 5/1991 | Nave |
| 6,717,485 | B2 | 4/2004 | Kolb et al. |
| 7,881,665 | B2 * | 2/2011 | Symons ............. G06K 19/0723 455/41.1 |
| 8,124,291 | B2 | 2/2012 | Yagi et al. |
| 9,020,425 | B2 * | 4/2015 | Symons ............. G06K 19/0723 455/41.1 |
| 9,136,914 | B2 * | 9/2015 | Von Novak .......... G06K 7/0008 |
| 9,143,199 | B2 * | 9/2015 | Bangs ................... H04B 5/0012 |
| 9,197,986 | B1 | 11/2015 | Kerselaers et al. |
| 9,407,334 | B2 * | 8/2016 | Toncich .................. H02J 7/025 |
| 9,584,191 | B2 * | 2/2017 | Hamilton ................ H03F 1/565 |
| 9,692,478 | B1 * | 6/2017 | Knepper .................. H04B 1/40 |
| 9,825,364 | B2 * | 11/2017 | O'Driscoll ............. H01Q 7/005 |
| 10,108,825 | B2 * | 10/2018 | Bienert .............. G06K 7/10148 |
| 10,153,809 | B2 * | 12/2018 | Zhou ..................... H04B 5/0037 |
| 10,158,174 | B2 * | 12/2018 | O'Driscoll ............. H01Q 7/005 |
| 2016/0182469 | A1 * | 6/2016 | Ahmed ............... H04L 63/0492 380/270 |
| 2016/0197510 | A1 * | 7/2016 | Strommer ............ H04B 5/0031 320/108 |
| 2017/0338562 | A1 * | 11/2017 | Ozenne .............. G06K 7/10356 |
| 2018/0276426 | A1 * | 9/2018 | Bienert .............. G06K 7/10148 |

* cited by examiner

*Primary Examiner* — Tuan A Tran (57) ABSTRACT

One example discloses a near-field device, configured to receive a non-propagating quasi-static near-field signal from a near-field antenna, including: a tuning circuit including a first impedance tuning bank and a second impedance tuning bank; a controller configured to, detect when the device is in an idle-state; set the first impedance tuning bank and the second impedance tuning bank to an initial set of values; bring the near-field antenna and the near-field device combination to a frequency within a near-field signal bandwidth by adjusting the first and/or second impedance tuning banks; measure a first received signal strength; and differentially adjust the first and second impedance tuning banks until a measured second received signal strength is less than the first received signal strength.

20 Claims, 5 Drawing Sheets

NEAR-FIELD DEVICE

The present specification relates to systems, methods, apparatuses, devices, articles of manufacture and instructions for near-field communications.

SUMMARY

According to an example embodiment, a near-field device, configured to receive a non-propagating quasi-static near-field signal from a near-field antenna, comprising: a tuning circuit including a first impedance tuning bank and a second impedance tuning bank; a controller configured to, detect when the device is in an idle-state; set the first impedance tuning bank and the second impedance tuning bank to an initial set of values; bring the near-field antenna and the near-field device combination to a frequency within a near-field signal bandwidth by adjusting the first and/or second impedance tuning banks; measure a first received signal strength; and differentially adjust the first and second impedance tuning banks until a measured second received signal strength is less than the first received signal strength.

In another example embodiment, the frequency within the near-field signal bandwidth is a resonance frequency of the near-field antenna.

In another example embodiment, the first and second impedances are capacitances.

In another example embodiment, a difference between the second received signal strength and the first received signal strength is based on an interference signal generated by a conductive structure.

In another example embodiment, the conductive structure is a magnetically conductive structure.

In another example embodiment, the conductive structure is an electrically conductive structure.

In another example embodiment, the conductive structure is a printed circuit board.

In another example embodiment, the conductive structure is coupled to the device by a stray and/or parasitic impedance; and the stray and/or parasitic impedance generates the interference signal.

In another example embodiment, the device is galvanically connectable to the conductive structure.

In another example embodiment, the device further includes the conductive structure;

In another example embodiment, the controller is configured to place the device in the idle-state before measuring.

In another example embodiment, the idle-state is when the near-field signal is below a threshold received signal strength.

In another example embodiment, the idle-state is when the near-field signal carrier frequency is not being modulated with a baseband signal.

In another example embodiment, the idle-state is when the near-field antenna is not receiving the non-propagating quasi-static near-field signal.

In another example embodiment, the device includes a first feed point and a second feed point; the feed points are connectable to the near-field antenna; one end of the first impedance tuning bank is coupled to the first feed point; one end of the second impedance tuning bank is coupled to the second feed point; and other ends of the first and second impedance tuning banks are coupled to a reference potential.

In another example embodiment, a difference between the second received signal strength and the first received signal strength is based on an interference signal generated by a conductive structure; the conductive structure is coupled to the device by a stray and/or parasitic impedance; the stray and/or parasitic impedance generates the interference signal; and the other ends of the first and second impedance tuning banks are galvanically coupled to the conductive structure.

In another example embodiment, the device is connectable to a battery; and the controller is configured to detect, set, bring, measure and adjust in response to an incremental change in a charge level of the battery.

In another example embodiment, the device is connectable to a set of electronic components; and the controller is configured to detect, set, bring, measure and adjust in response to connection and/or disconnection of at least one of the electronic components.

In another example embodiment, the device is embedded in at least one of: a wearable device, a hearing aid, an earbud, a smart watch, or a smart phone.

According to an example embodiment, a method of enabling a near-field device, that is configured to receive a non-propagating quasi-static near-field signal from a near-field antenna, to be operated, comprising: distributing a set of instructions, stored on a non-transitory, tangible computer readable storage medium, for configuring the near-field device; wherein the instructions include, detecting when the device is in an idle-state; setting a first impedance tuning bank and a second impedance tuning bank to an initial set of values; bringing the near-field antenna and the near-field device combination to a frequency within a near-field signal bandwidth by adjusting the first and/or second impedance tuning banks; measuring a first received signal strength; and differentially adjusting the first and second impedance tuning banks until a measured second received signal strength is less than the first received signal strength; and wherein differentially adjusting includes setting and/or incrementing the impedance tuning bank values independently of each other and/or based on an equation or algorithm that can cause the impedance tuning bank values to not be equal and/or be not incremented equally.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are body communication and other wireless networked devices based on near-field electromagnetic induction (NFEMI), where the transmitter and receiver are coupled by both magnetic (H) and electric (E) fields or on near-field magnetic induction (NFMI), where the transmitter and receiver are coupled by just magnetic (H) fields. While RF wireless communication is accomplished by propagating an RF plane wave through free space, NFEMI and NFMI communication utilizes non-propagating quasi-static H and E fields.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance structures at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space.

Near-field magnetic induction (NFMI) communication may also be used for such body communications, however these magnetic fields are not coupled to the body. As a result, these magnetic field devices can be farther away from the body than NFEMI devices and still ensure communication. The NFMI range however is much shorter than a full body due to small antenna sizes in wearable devices.

Small antenna geometries are efficient for NFMI and NFEMI antennas since they minimize radiating waves in free space.

Figure 1:
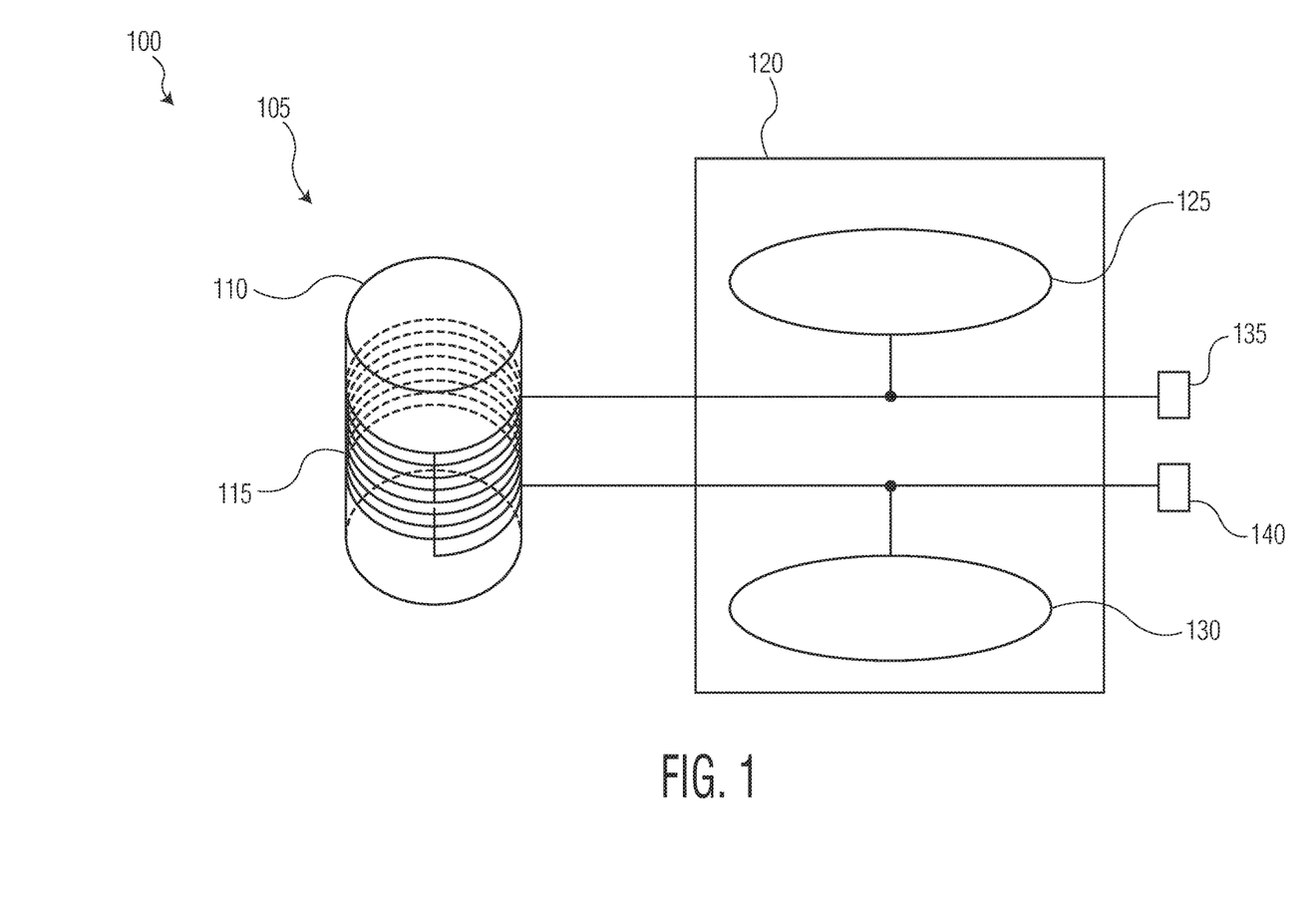
FIG. 1 is a first example near-field antenna.

FIG. 1 is an example near-field electromagnetic induction (NFEMI) antenna 100 for use in a wireless device. The antenna 100 in this example is an electromagnetic induction (NFEMI) antenna. In some example embodiments, the antenna 100 includes a coil antenna 105 (i.e. for magnetic fields) in conjunction with a short loaded dipole 120 (i.e. for electric fields). The coil antenna 105 includes a ferrite core 110 wound with wire 115. The short dipole 120 include two loading plates 125 and 130. Antenna 100 feed points 135, 140 are coupled to various transceiver circuitry, such as downstream radio transmitter and receiver integrated circuit (RF-IC), (not shown here).

The short loaded dipole portion 120 is responsive to an electric (E) field. The coil antenna portion 105 is responsive to a magnetic (H) field.

When the NFEMI antenna 100 is proximate to a body (e.g. a person, an object, etc.) the magnetic and electric fields will be substantially confined to the body and not significantly radiate in free-space. This enhances security and privacy of such body networked communications.

In various example embodiments, the antenna 100 operates at or below 50 MHz to ensure that the fields are following the body contours and to ensure that far field radiation is strongly reduced. The size of the coil antenna 105 and the transmit frequency are chosen to reduce any far field radiation that may be created by the coil antenna 105. For example, the size of the coil antenna 105 can be 2 mm in diameter and 6 mm in length and the transmit frequency kept below 50 MHz.

Figure 2:
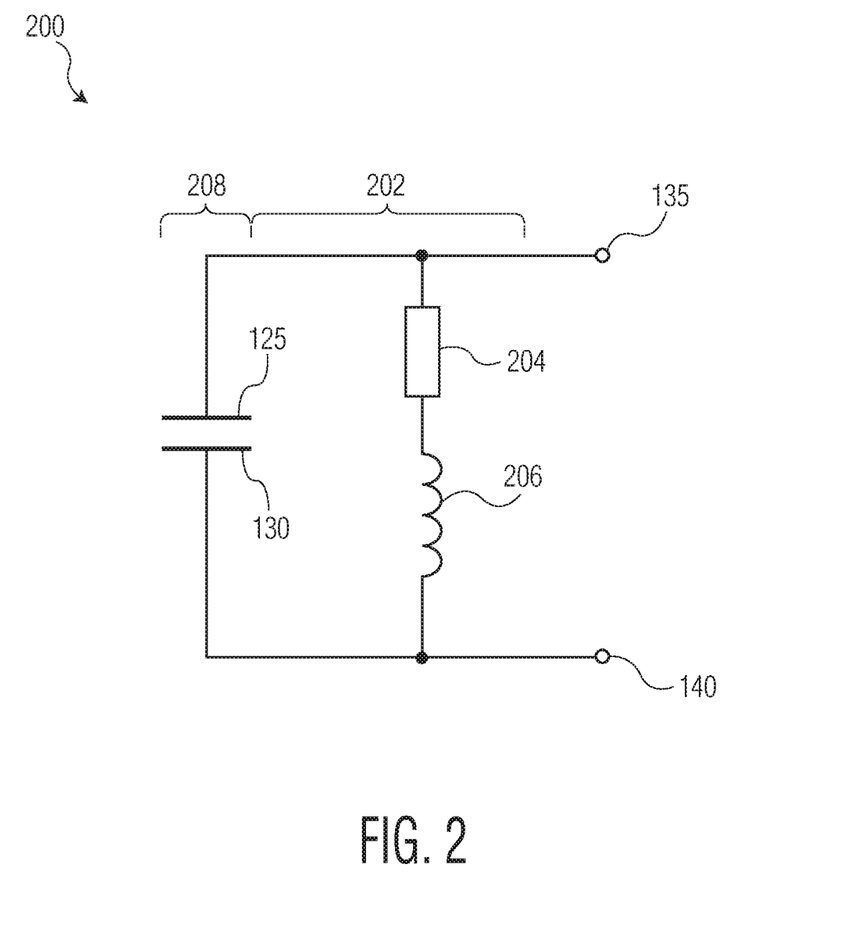
FIG. 2 is an example idealized electrical equivalent of the near-field antenna.

FIG. 2 is an example idealized electrical equivalent 200 of the near-field antenna 100. The example idealized antenna 200 includes an H-field antenna 202, having a resistance 204 and an inductance 206, an E-field antenna 208, having a conductive structure formed from the two loading plates 125 and 130, and the two feeding points 135, 140.

Figure 3:
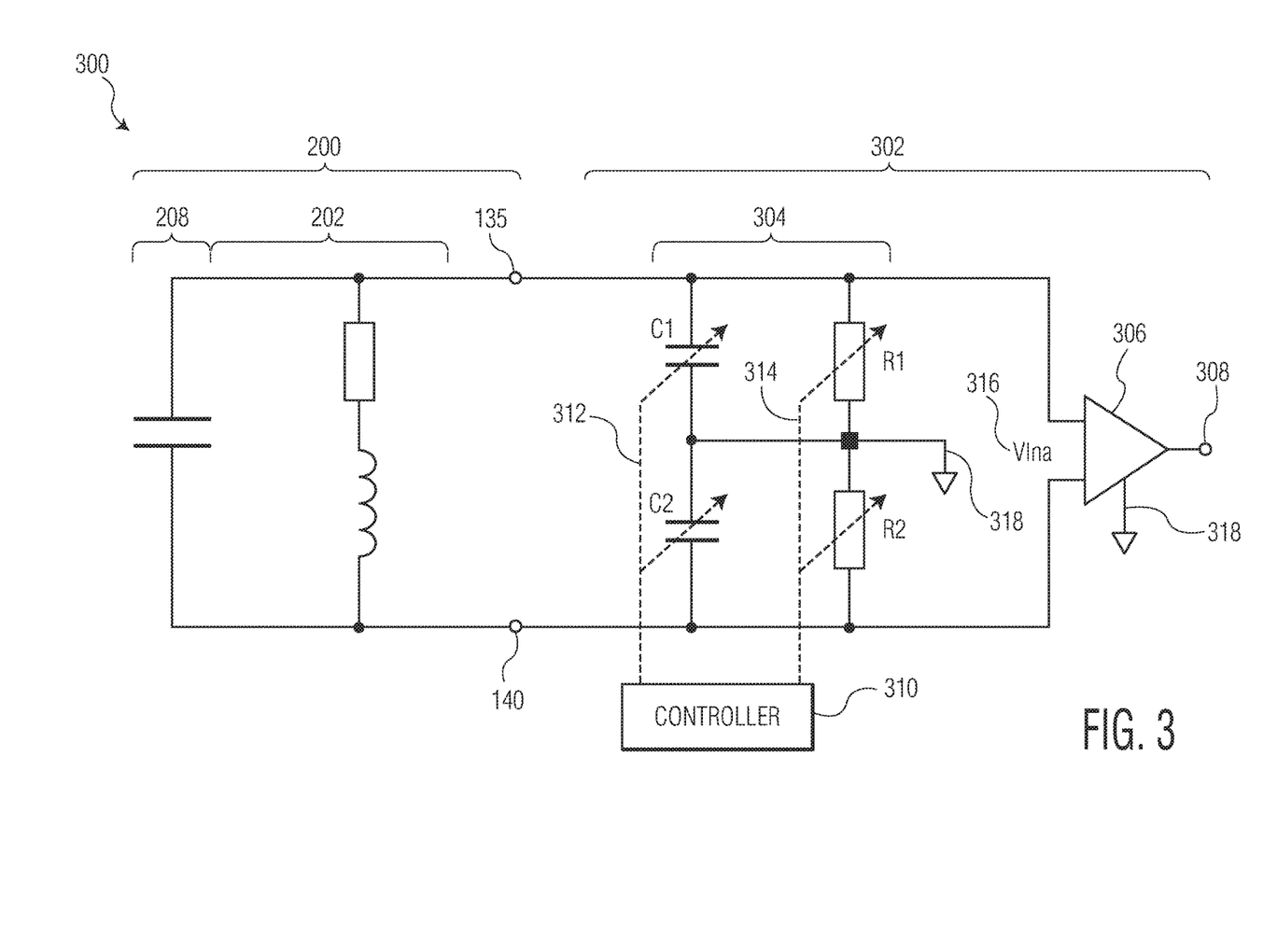
FIG. 3 is an example idealized electrical equivalent of a near-field device coupled to the near-field antenna and configured to receive a non-propagating quasi-static near-field signal.

FIG. 3 is an example idealized electrical equivalent 300 of a near-field device 302 coupled to the near-field antenna 200 and configured to receive a non-propagating quasi-static near-field signal. The example 300 includes the H-field antenna 202 and the E-field antenna 208, shown in FIG. 2.

Tuning circuit 304 is coupled to the first and second feed points 135, 140. The tuning circuit 304 includes a first variable tuning capacitance bank (C1), a second variable tuning capacitance bank (C2), a first variable tuning resistance bank (R1), and a second variable tuning resistance bank (R2). The capacitance banks and resistance banks are coupled to a reference potential 318 (e.g. a ground potential). The capacitive and resistive banks are coupled to a controller 310.

The controller 310 adjusts the first and second capacitance banks (C1), (C2) to adjust a resonant frequency of the magnetic 202 and the electric 208 antennas (e.g. to 10.6 MHz). The controller 310 adjusts the first and second resistance banks (R1), (R2) to adjust a bandwidth of the magnetic 202 and the electric 208 antennas (e.g. to 400 KHz) sufficient to allow the non-propagating quasi-static near-field signal to be received from the antennas 202, 208.

In this example 300, the capacitance banks (C1), (C2) are equally tuned using a single control line 312 from the controller 310 and the resistance banks (R1), (R2) are equally tuned using another single control line 314 from the controller 310.

An LNA 306 (low noise amplifier) is coupled between the tuning circuit 304 and a communications signal interface 308. When the antenna 200 and device 302 are receiving the non-propagating quasi-static near-field signal, induced voltage 316 (Vlna) is present across the LNA 306 differential inputs. The LNA 306 amplifies the received near-field signal which is then further processed by additional radio/RFIC/baseband circuits (not shown) coupled to the communications signal interface 308. The LNA 306 is also coupled to the reference potential 318.

Since both inputs to the LNA 306 are coupled to the antennas 202, 208 this near-field device configuration is said to be balanced. The balanced circuit configuration helps reject interference signals that enter both LNA 306 input lines with the same amplitude and phase.

Figure 4:
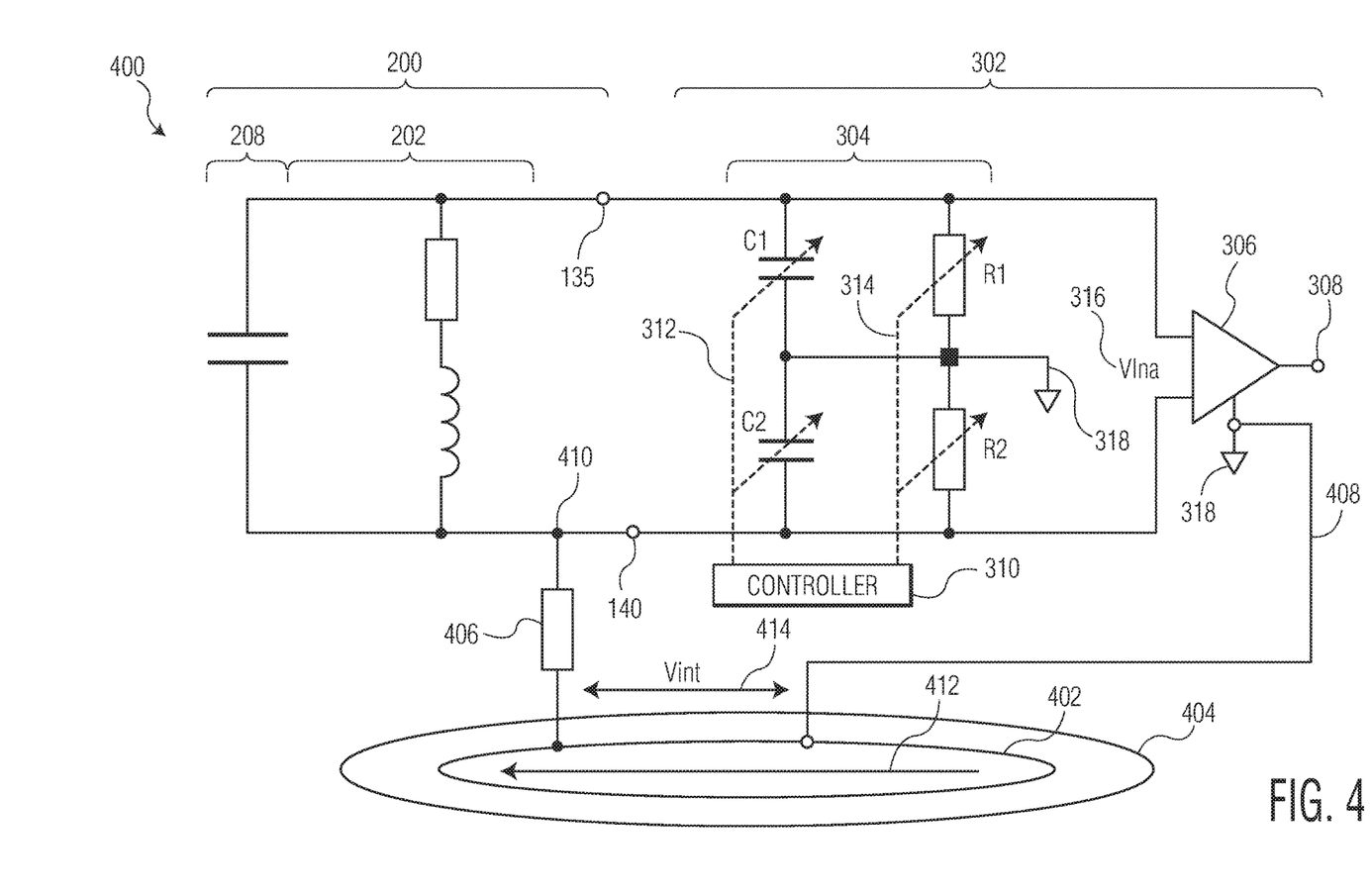
FIG. 4 is an example idealized electrical equivalent of the near-field device coupled to the near-field antenna and proximate to a magnetically and/or electrically conductive structure.

FIG. 4 is an example idealized electrical equivalent 400 of the near-field device 302 coupled to the near-field antenna 200 of FIG. 3 and a magnetically and/or electrically conductive structure 402 (e.g. a printed circuit board tracings and/or components, a wiring bundle, a flexible carrier, shielding, etc.) on a substrate 404. The device 302 and antenna 200 in various examples can be attached or positioned proximate to (e.g. within 1 mm if inside an earbud, a smart watch, a smart phone, or another wearable device) the conductive structure 402.

Due to this close proximity a stray/parasitic impedance 406 can be created between the conductive structure 402 and the antenna 200. Components coupled to the conductive structure 402 or on the substrate 404 can generate induced interference currents 412 resulting in induced interference voltages 414 (Vint) which thereby inject interference signals into the antenna 200 and device 302 and affecting Vlna 316 and thus a received signal strength at the communications signal interface 308.

Depending upon the characteristics of the conductive structure 402 and/or its physical positioning with respect to the antenna 200 and device 302 the stray/parasitic impedance 406 may have more capacitive or inductive effects on the antenna 200 and device 302. For example, if the antenna 200 is positioned at a 90 degree angle with respect to the conductive structure 402, then one end of the wire coil 115 will be closer than another end of the wire coil 115 and thus result in different stray/parasitic impedances 406 with the conductive structure 402. Such unbalanced coupling can even occur for flat spiral coil antennas.

The conductive structure 402 and substrate 404 may include: radio circuitry, audio circuitry, digital signal processing circuitry, amplifiers and power supplies.

Direct galvanic coupling 408 between the reference potential 318 of the near-field device 302 and the conductive structure 402 will also effect the stray/parasitic impedance 406 characteristics and thus any resulting interference signals injected into the antenna 200 and device 302.

Any EMI shielding proximate to any of these components 200, 302, 404, 404 may actually increase injected interference signals. For example, if a switched mode power supply (SMPS) is coupled to the conductive structure 402 and/or used to drive any of the components, this power supply's switching creates additional interference signal noise. Switched mode supplies are commonly used to reduce power consumption and to increase the time a product can be used before charging again. However, these switched mode power supplies use coils that can create the induced current 412 and induced voltage 414 (Vint). Such interference signals can have a wide frequency range which overlaps the near-field signal band (e.g. since the near-field frequencies are relatively low).

In some examples there may be additional stray/parasitic impedances (not shown) coupled to any and all lines of the antenna 200 and device 302, beyond just the stray/parasitic impedance 406 shown coupled to point 410. Such additional stray/parasitic impedances can significantly unbalance the Vlna 316 signal into the LNA 306.

The number and location of these stray/parasitic impedance 406 are is very difficult to control because they are dependent on a mechanical design and particular physical layout of products and systems that include the antenna 200 and device 302. Such interference signals 412, 414 can increase a noise floor at the communications signal interface 308 (e.g. reduce a sensitivity of the baseband radio circuits) by 6 to 20 dB even when an interference friendly design is being used.

Figure 5:
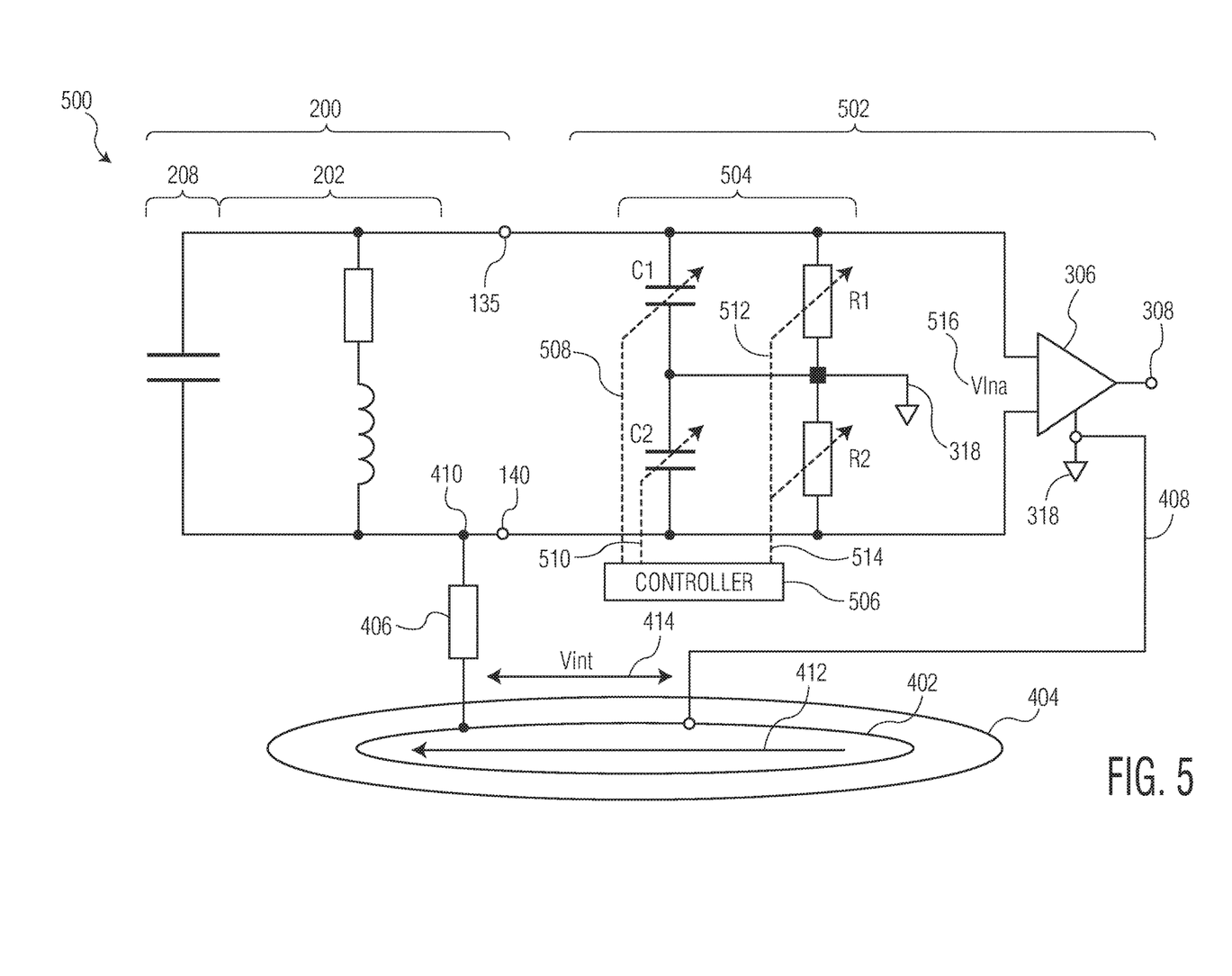
FIG. 5 is an example idealized electrical equivalent of an example embodiment of a near-field device coupled to the near-field antenna and proximate to the magnetically and/or electrically conductive structure.

FIG. 5 is an example idealized electrical equivalent 500 of an example embodiment of a near-field device 502 coupled to the near-field antenna 200 and configured to receive a non-propagating quasi-static near-field signal. The near-field device 502 is positioned proximate to the magnetically and/or electrically conductive structure 402.

Tuning circuit 504 is coupled to the first and second feed points 135, 140. The tuning circuit 504 includes a set of impedance banks, such as a first variable tuning capacitance bank (C1), a second variable tuning capacitance bank (C2), a first variable tuning resistance bank (R1), and a second variable tuning resistance bank (R2). The capacitance banks and resistance banks are coupled to a reference potential 318 (e.g. a ground potential). The capacitive and resistive banks are coupled to a controller 506.

The controller 506 individually adjusts the first and second capacitance banks (C1), (C2), via control lines 508 and 510 respectively, to adjust a resonant frequency of the magnetic 202 and the electric 208 antennas (e.g. to 10.6 MHz). The controller 506 also adjusts the first and second resistance banks (R1), (R2), via control lines 512 and 514 respectively, to adjust a bandwidth of the magnetic 202 and the electric 208 antennas sufficient to allow the non-propagating quasi-static near-field signal to be received from the antennas 202, 208.

In this example embodiment 500, the controller 506 can adjust capacitance banks (C1), (C2) either equally or differentially by using control lines 508 and 510. The controller 506 can also adjust the resistance banks (R1), (R2) either equally or differentially by using control lines 512 and 514.

Equally adjusting is herein defined to include either setting the variable tuning bank values equal to each other, or by equally incrementing the variable tuning bank values even though they are different. Differentially adjusting is herein defined to include setting and/or incrementing the variable tuning bank values independently of each other and/or based on an equation or algorithm that can cause the variable tuning bank values to not be equal and/or be not incremented equally.

In some example embodiments, the controller 506, either detects when the near-field device 502 is in an idle-state (e.g. RSSI_IDLE) or sets the near-field device 502 to the idle-state.

The idle-state of the near-field device 502 is generally a state where the controller 506 can adjust the impedance banks (C1), (C2), (R1), and/or (R2) (i.e. adjust the antenna's 200 resonance and bandwidth), using the individual control lines 508, 510, 512, 514 to reduce the interference signals received by the LNA 306 before the near-field device 502 is set back to an operational-state when near-field signals are received by the antenna 200 and device 502.

The idle-state in various example embodiments is herein defined to include: when a received near-field signal is below a threshold received signal strength; when a received near-field signal carrier frequency is not being modulated with a baseband signal by its source device; and when the near-field antenna 200 is not receiving the non-propagating quasi-static near-field signal.

The controller 506 then sets the impedance banks to an initial set of values, which in some example embodiment are equal and in other example embodiment are not equal. The controller 506 then brings the near-field antenna 200 and the near-field device 502 combination to a frequency (e.g. a resonance frequency) within the near-field signal bandwidth by adjusting one or more of the impedance bank impedances.

The controller 506 measures a received signal strength (i.e. an interference signal received by the LNA 306, a noise floor of the antenna 200 and device 502 combination, etc.) at Vlna 516. The controller 506 then differentially (i.e. individually) adjusts the impedance bank impedances until a measured second received signal strength at Vlna 516 is less than the first (e.g. prior) received signal strength. This reduces near-field signal degradation caused by interference signals generated by the conductive structure 402 and/or circuit components connected thereto.

Individual control of the impedance banks (C1), (C2), (R1), and/or (R2) particularly enables unbalanced interference signals from the conductive structure 402 and/or circuit components to be damped out.

The controller 506 interference damping operations described above can be implemented at device 502 power-up, or at various times during device operation. For example, the controller 506 interference damping operations can also be triggered by changes to the electrical components operations (i.e. turning on or off, audio or video streaming operations, download operations, NFC operations, etc.) or by connection and/or disconnection of additional electrical components to an apparatus that the device 502 is embedded in.

The controller 506 interference damping operations can also be triggered by changes in a battery charge level of the apparatus, since the frequency of a switched mode power supply can change based on the battery charge level.

In some example embodiments the controller 506 include an expected received signal strength during the idle-state (e.g. RSSI_IDLE is known for a certain device) and if there is any deviation, within a certain tolerance, the controller 506 adjusts for a new set of impedances (C1), (C2), (R1), and/or (R2) that reduce the received signal strength (e.g. interference signal) during the idle-state to a range that is acceptable.

Now discussed is an example embodiment set of measurements of for a near-field device with and without differentially adjusted impedance bank tuning. In this example an interference signal is defined as one that falls within the near-field device communication bandwidth and centered about 10 MHz and is above 0.5 mVrms.

In a first example measurement, with equally adjusted capacitive bank tuning, a stray capacitance of 0.5 pF injects an interference signal of 40 dBuV at the LNA input. Since a normal noise level is 22 dBuV, the injected interference signal substantially raises the noise floor at the LNA input.

In a second example measurement, with equally adjusted capacitive bank tuning, a stray capacitance of 0.1 pF injects an interference signal of 27 dBuV at the LNA input. This injected interference signal also raises the noise floor at the LNA input.

However, using differentially adjusted capacitive bank tuning with two capacitor banks having a range of 80 to 240 pF, an interference signal reduction of 6 dB has been measured for both cases discussed above (i.e. 34 dBuV and 21 dBuV respectively). Increasing the capacitor bank range can further lower the interference signal.

Operation of the controller 506 as discussed above can in various example embodiments include fixed circuitry, logic gates, an FPGA, and/or instructions stored in memory and executed by a processor. The controller 506 can also include an input/output data interface. The operational instruction can in some example embodiments be stored in a non-transient machine-readable storage medium. The machine-readable storage medium would include the instructions which control how the processor receives input data and transforms the input data into output data, using data within the storage device.

Operation of the controller 506 can be executed in any order, unless a specific order is explicitly stated. Also, those skilled in the art will recognize that while one example set of operations have been discussed, the material in this specification can be combined in a variety of ways to yield other examples as well, and are to be understood within a context provided by this detailed description.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In this specification, example embodiments have been presented in terms of a selected set of details. However, a person of ordinary skill in the art would understand that many other example embodiments may be practiced which include a different selected set of these details. It is intended that the following claims cover all possible example embodiments.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field device, configured to receive a non-propagating quasi-static near-field signal from a near-field antenna, comprising:
    a tuning circuit including a first impedance tuning bank and a second impedance tuning bank;
    a controller configured to,
        detect when the device is in an idle-state;
        set the first impedance tuning bank and the second impedance tuning bank to an initial set of values;
        bring the near-field antenna and the near-field device combination to a frequency within a near-field signal bandwidth by adjusting the first and/or second impedance tuning banks;
        measure a first received signal strength; and
        differentially adjust the first and second impedance tuning banks until a measured second received signal strength is less than the first received signal strength.

2. The device of claim 1:
    wherein the frequency within the near-field signal bandwidth is a resonance frequency of the near-field antenna.

3. The device of claim 1:
    wherein the first and second impedances are capacitances.

4. The device of claim 1:
    wherein a difference between the second received signal strength and the first received signal strength is based on an interference signal generated by a conductive structure.

5. The device of claim 4:
    wherein the conductive structure is a magnetically conductive structure.

6. The device of claim 4:
    wherein the conductive structure is an electrically conductive structure.

7. The device of claim 4:
    wherein the conductive structure is a printed circuit board.

8. The device of claim 4:
    wherein the conductive structure is coupled to the device by a stray and/or parasitic impedance; and
    wherein the stray and/or parasitic impedance generates the interference signal.

9. The device of claim 8:
    wherein the device is galvanically connectable to the conductive structure.

10. The device of claim 4:
    wherein the device further includes the conductive structure.

11. The device of claim 1:
    wherein the controller is configured to place the device in the idle-state before measuring.

12. The device of claim 1:
    wherein the idle-state is when the near-field signal is below a threshold received signal strength.

13. The device of claim 1:
    wherein the idle-state is when the near-field signal carrier frequency is not being modulated with a baseband signal.

14. The device of claim 1:
    wherein the idle-state is when the near-field antenna is not receiving the non-propagating quasi-static near-field signal.

15. The device of claim 1:
    wherein the device includes a first feed point and a second feed point;
    wherein the feed points are connectable to the near-field antenna;
    wherein one end of the first impedance tuning bank is coupled to the first feed point;
    wherein one end of the second impedance tuning bank is coupled to the second feed point; and
    wherein other ends of the first and second impedance tuning banks are coupled to a reference potential.

16. The device of claim 15:
    wherein a difference between the second received signal strength and the first received signal strength is based on an interference signal generated by a conductive structure;
    wherein the conductive structure is coupled to the device by a stray and/or parasitic impedance;
    wherein the stray and/or parasitic impedance generates the interference signal; and
    wherein the other ends of the first and second impedance tuning banks are galvanically coupled to the conductive structure.

17. The device of claim 1:
    wherein the device is connectable to a battery; and
    wherein the controller is configured to detect, set, bring, measure and adjust in response to an incremental change in a charge level of the battery.

18. The device of claim 1:
    wherein the device is connectable to a set of electronic components; and
    wherein the controller is configured to detect, set, bring, measure and adjust in response to connection and/or disconnection of at least one of the electronic components.

19. The device of claim 1:
    wherein the device is embedded in at least one of: a wearable device, a hearing aid, an earbud, a smart watch, or a smart phone.

20. A method of enabling a near-field device, that is configured to receive a non-propagating quasi-static near-field signal from a near-field antenna, to be operated, comprising:
    distributing a set of instructions, stored on a non-transitory, tangible computer readable storage medium, for configuring the near-field device;
    wherein the instructions include,
        detecting when the device is in an idle-state;
        setting a first impedance tuning bank and a second impedance tuning bank to an initial set of values;
        bringing the near-field antenna and the near-field device combination to a frequency within a near-field signal bandwidth by adjusting the first and/or second impedance tuning banks;
        measuring a first received signal strength; and
        differentially adjusting the first and second impedance tuning banks until a measured second received signal strength is less than the first received signal strength; and
    wherein differentially adjusting includes setting and/or incrementing the impedance tuning bank values independently of each other and/or based on an equation or algorithm that can cause the impedance tuning bank values to not be equal and/or be not incremented equally.

* * * * *